(No Model.)

G. R. MELONEY.
STRAINER.

No. 563,864. Patented July 14, 1896.

Witnesses
Arthur Ashley
G. S. Elmor.

Inventor
G. R. Meloney
By P. T. Dodge
Attorney

UNITED STATES PATENT OFFICE.

GEORGE REID MELONEY, OF PHILADELPHIA, PENNSYLVANIA.

STRAINER.

SPECIFICATION forming part of Letters Patent No. 563,864, dated July 14, 1896.

Application filed July 1, 1895. Serial No. 554,542. (No model.)

*To all whom it may concern:*

Be it known that I, GEORGE REID MELONEY, of Philadelphia, county of Philadelphia, and State of Pennsylvania, have invented a new and useful Improvement in Strainers or Filters, of which the following is a specification.

This invention has reference to strainers or filters, and relates more particularly to strainers for milk, the object being to remove from the latter the very fine and objectionable sediment or silt, which being heavier than the liquid body settles at the bottom.

With this end in view I have constructed an improved strainer in which the milk or other liquid to be cleansed is caused to flow upward through a straining-body as distinguished from flowing downward, the result being that separation of the impurities is aided by the natural tendency of the heavier particles to fall downward by gravity, the passage of the milk through the strainer retarding its flow and thus permitting the heavier particles to fall more rapidly than if the milk were unretarded in its flow.

Figure 1:
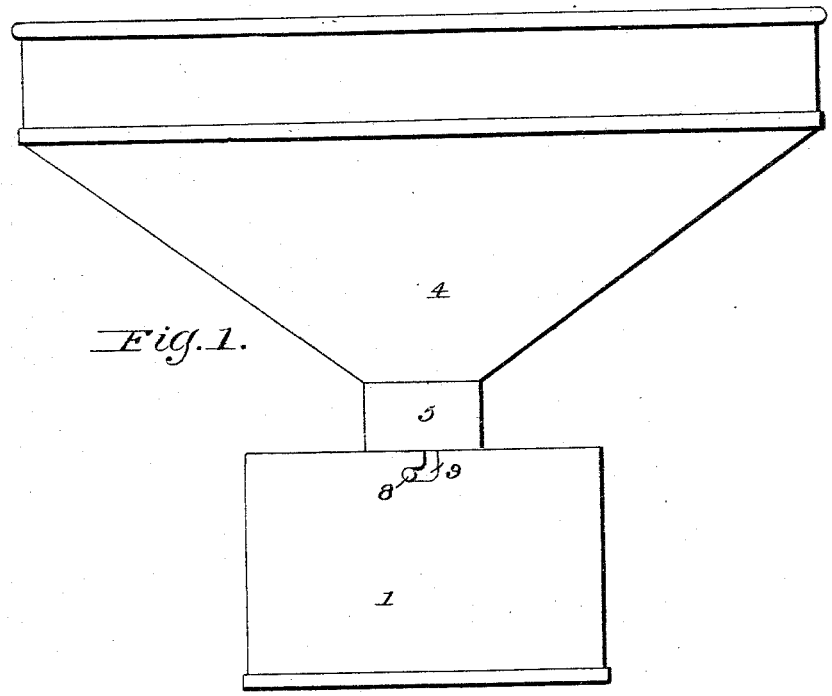
Figure 2:
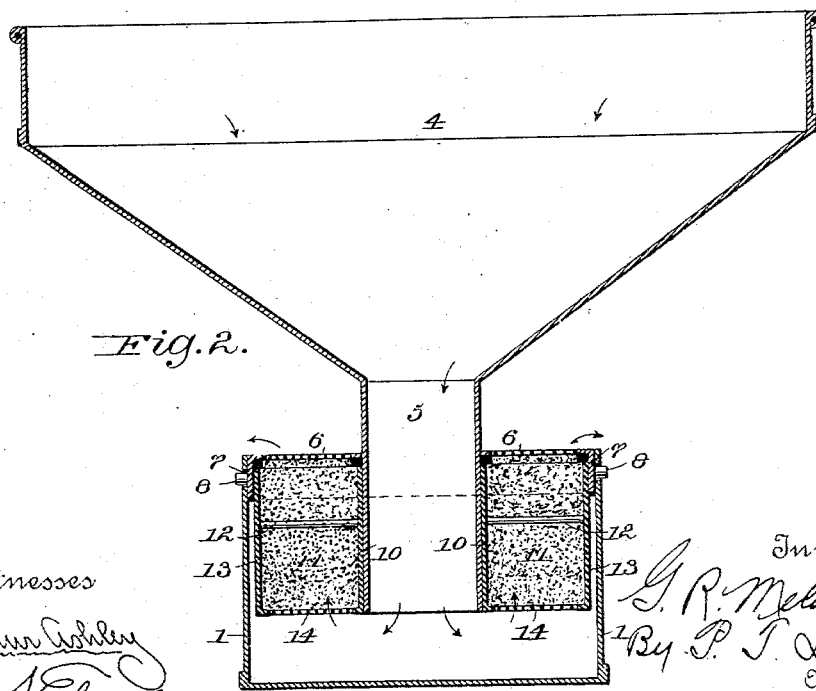

In the accompanying drawings, Figure 1 is a side elevation of my improved strainer. Fig. 2 is a vertical central section through the same.

Referring to the drawings, 1 represents a cup or vessel in the top of which is removably seated a strainer 6, fixed to and surrounding a tube 5, depending from a funnel 4, the size and form of the parts being such that when the strainer is seated in the top of the vessel the depending tube will extend below the same some distance into the vessel, so that the liquid to be strained will be delivered beneath the strainer and will be caused to flow upward therethrough and to overflow the upper edge of the vessel. This strainer is formed on its peripherical edge with a downwardly-extending flange 7, of a size to fit snugly and closely in the top of the vessel, and the flange is provided with pins 8, adapted to enter angular slots 9 in the edge of the cup. The portion of the tube extending below the strainer is surrounded by a collar 10, forming the central circular wall of a cage 11, which is adapted to receive suitable filtering material, such as sterilized sand, &c. This collar has horizontal arms 12 extending radially outward therefrom, and at the outer ends these arms sustain a cylinder 13, which forms the outer wall of the cage, the two walls being connected together at their lower ends by a perforated annular plate 14.

In assembling the parts the cage is first filled with the proper filtering material and slipped upward onto the depending tube of the strainer, and the two then seated within the top of the cup.

In operation the milk or other liquid to be strained is poured into the funnel and will flow downward through its tube to the bottom of the cup. The heavier particles of the milk will drop by gravity and the current continuing will flow upward through the filtering-layer and will overflow the top of the cup, whence it may be received in any suitable vessel. The filtering material and strainers through which the milk flows not only act to retard the passage of the sediment, but serve as obstructions to the flow of the milk, compelling it to move slowly. When thus moving slowly, the foreign substances, which would be carried by a rapidly-moving current, will drop by gravity, so that the milk overflowing the receiving vessel will be thoroughly cleansed and freed from any impurities.

Having thus described my invention, what I claim is—

1. The combination with a vessel open at its top, of a central imperforate open-ended tube extending down into the vessel, and an upper and a lower strainer-disk through which said tube passes, the space between the two disks forming a chamber or receptacle in the upper end of the vessel, a filtering material in said chamber the upper disk forming a cover for the vessel, and the entire filtering device, formed of said disks and material being situated above the lower open end of the tube, substantially as set forth.

2. The combination with the vessel open at its top, of an annular filter cage or holder removably fitting the upper portion thereof, the tubular inner and outer wall of said cage or holder being imperforate and open at both ends and the bottom of the cage being foraminated to permit an upflow, and an annular strainer-disk fitting over the upper end of said vessel and cage or holder and forming a cover therefor, the entire filtering and straining devices being situated above the lower open end of the tube, substantially as set forth.

3. The combination with the receiving vessel provided with angular slots in its upper edge, of the depending tube extending into the vessel, a laterally-projecting circular strainer fixed to and surrounding the tube and formed on its peripherical edge with a depending flange adapted to fit snugly in the top of the vessel, and pins fixed to said flange and arranged to enter the angular slots.

4. The combination with a receiving vessel, of a removable strainer seated in its upper end and provided with a central depending tube, and a removable annular cage applied to said tube and formed with a perforate bottom.

In testimony whereof I hereunto set my hand this 13th day of June, 1895, in the presence of two attesting witnesses.

GEORGE REID MELONEY.

Witnesses:
C. V. BARTLE,
J. ALFRED COXE.